Nov. 5, 1935.  R. A. MASTEN  2,019,541
SMOOTHNESS TESTER
Filed March 29, 1933
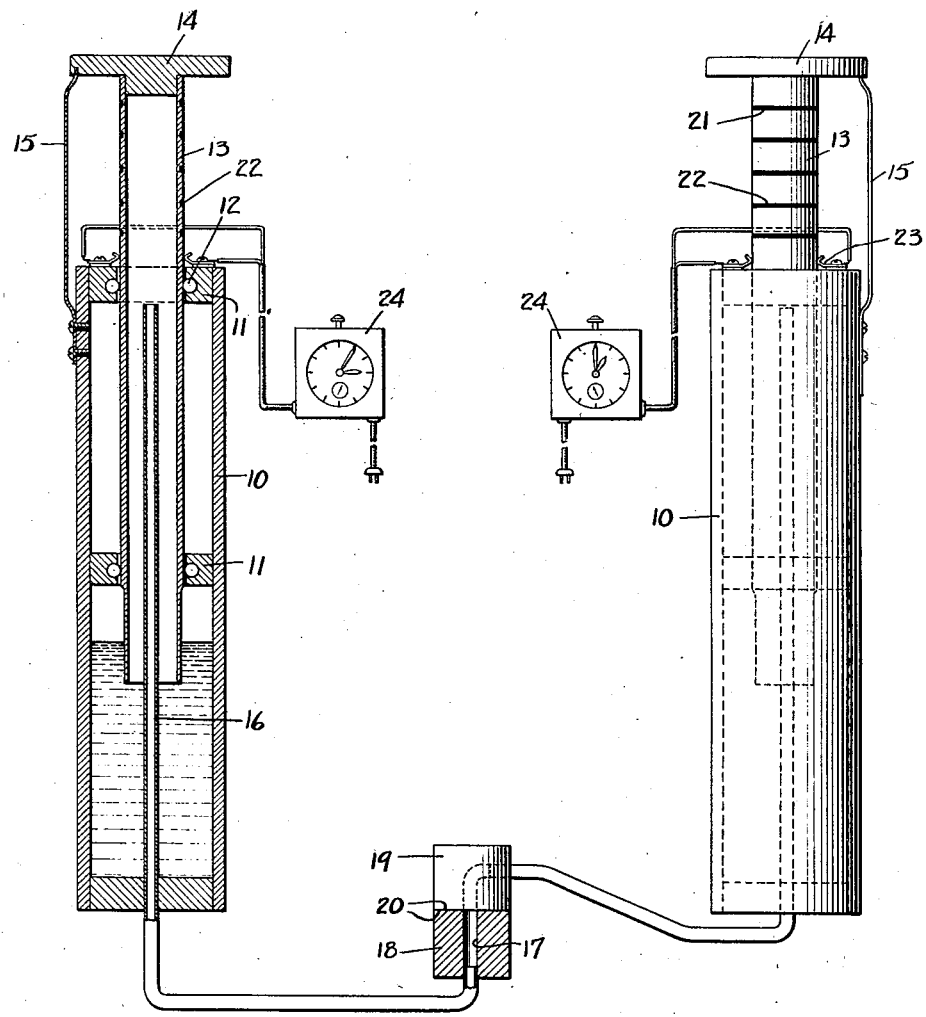
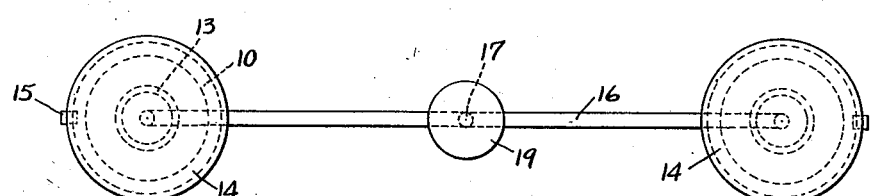
INVENTOR
Ralph A. Masten
BY
ATTORNEY Patented Nov. 5, 1935

2,019,541

UNITED STATES PATENT OFFICE 2,019,541

SMOOTHNESS TESTER

Ralph A. Masten, South Glen Falls, N. Y., assignor to International Paper Company, New York, N. Y., a corporation of New York Application March 29, 1933, Serial No. 663,329

9 Claims. (Cl. 73—51)

My present invention relates to a means to measure the smoothness of paper or other thin materials.

The particular need for a standard of smoothness has long been felt in various industries, most particularly in the paper industry. One instance where it has been desired to express the smoothness of paper is in the printing trade. The ability of paper to take a sharp, clear printed impression depends largely on the smoothness of the sheet. Other factors such as the treatment of the raw stock, coarseness of fibres and methods of sizing and finishing have been studied and their effects noted. But the same method of making paper may produce sheets having varying printing qualities. For this reason it is desirable that the effect of variations in time of treatment, quantity of size and other factors should be closely studied at the paper mill.

In the printing trade various factors enter into the making of clear reproductions, such as the type of ink, printing pressure, selection of rolls and preparation of the form. The printing form is even and rigid, hence closer contact and as a result clearer impression is attained with smooth paper than with rougher grades. It is therefore extremely desirable, once a press has been set up to turn out the best results on sample pieces, that the whole job should be completed on paper of uniform smoothness. The surface smoothness also determines to a large extent the life of composition sticks and other parts.

Devices are available for measuring the gloss or sheen of paper, but measurement of this optical quality is not a measurement of the physical quality of smoothness. Abrasion and rubbing tests do not meet requirements because the results obtained depend not so much on the surface smoothness as on the surface texture and fiber strength and coherence. Examination with a microscope merely indicates texture and matting of fibres and will not give a numerical indicia of smoothness.

My invention contemplates the measurement of smoothness by determining the time required for a known quantity of air at a known pressure to escape between a smooth true plane of standard dimension and a sample piece. The greater the smoothness of the sample the fewer and smaller will be the avenues of escape for the air and the higher the index of smoothness as expressed in time.

One embodiment of my invention is disclosed in the accompanying drawing taken in connection with the following specification, wherein like numerals refer to like parts.

Referring to the drawing:

Fig. 1 is an elevation, partly in section, of the apparatus, and

Fig. 2 is a plan view thereof.

It is recognized that the opposite sides of any paper will have different characteristics, the "felt" side taking on surface qualities imparted by the "felt", and the "wire" side taking on surface qualities imparted by the "wire". My apparatus measures the smoothness of both sides by identical means, hence a description of one of these means suffices for both.

The invention comprises a container 10 having spaced, annular, internal flanges 11 seating ball bearings 12 contacting and guiding a cylinder 13. Cylinder 13 is open at its lower end and extends into a liquid in container 10 forming a seal for air in the cylinder. This end is made thinner than the remainder of the cylinder so as to lessen the resistance of the liquid to lowering of the cylinder therein. The other end of the cylinder is sealed by a cap 14, the combined weight of the cap and cylinder preferably being a standard weight so as to cause an air pressure of a definite amount. For example, if the combined weight of the cap and cylinder is one-half pound and the area of the inner cylinder is one square inch, an air pressure of one half pound per square inch will be obtained. A spring strip 15 supports cylinder 13 at its upper position when the instrument is not in use and is withdrawn from contact with cap 14 to allow cylinder 13 to drop when a test is being made.

A tube 16 extends through the bottom of container 10 and well up into the cylinder 13, being open to the enclosed air. A flexible portion of the tube extends into an opening 17 through a block 18. A similar block 19 is associated with the other identical container and cylinder. Openings 17 extend to the opposite faces 20 of the blocks, faces 20 being machined so smoothly that the blocks 18 and 19 can be caused to adhere when a rubbing contact is made. Thus faces 20 constitute true plane surfaces and when in contact with each other no air can escape from cylinders 13.

Cylinder 13 is graduated as at 21, the time required for two or more of these graduations to pass an index point affording means to measure the rate of escape of a known quantity of air through tube 16. This may be visually determined, but more accurate results will be obtained by positive timing. This is accomplished by means of an electric stop watch, which is an electric clock with the start and stop arrangement controlled by an electro-magnetic clutch. Such watches are in common use and any standard type can be installed. The electromagnetic clutch is controlled in my device by insulated conducting rings 22 set into cylinder 13 at the graduation marks and contacting spring points 23 to close the clutch circuit. Clock 24 is thus started when the first ring 22 passes points 23 and stopped when the next ring 22 passes.

In operation a sample of any size is positioned between the blocks 18 and 19, the upper block being of sufficient weight to clamp the sample firmly in the desired position. Since the blocks are of a standard size, the material to be tested may extend beyond their edges. If a visual determination is to be made the cylinders are released from the spring strips simultaneously and a reading taken by observation of the drop of one of the cylinders and the time required for the cylinder to drop a distance equal to the space between two or more of the graduations marked thereon. Thus the time required for two graduation to pass the index point will indicate the smoothness of that side of the sample. A similar observation may then be made for the other side of the sample. Obviously, when the stop watches or other automatic reading devices are used, both sides of the sample can be tested at the same time. If the material is very rough the time required will be very small and three or more graduations can be observed, the observed time being divided by the number of spaces to obtain a unit indicia. It is desirable that more than two rings 22 be used on each cylinder for the following reasons; the observer may wish to use the second and third graduation for reasons which would be best apparent to him under the conditions in which he is working; or by means of some circuit, a number of which are well known and which form no part of my invention, the stop watches may be made to start at the passage of the first ring and to stop after receiving two or more impulses due to the passage of two or more rings on the cylinder; or it is possible that the stop watch will begin at the passage of the first ring and stop at the passage of the second ring, allowing a small period of time within which a reading may be taken before it again begins to run to indicate the time of passage of the third and fourth rings.

It is essential, in order to obtain an accurate indication of the smoothness of any given sample that both cylinders be used so that the air pressure on both sides of the sample will be balanced. By insuring the creation of equal pressure on both sides of the sample any cross flow due to the inherent porosity of the sample will be prevented. The porosity of the sample is the most disturbing factor where materials are highly porous, but there is a further factor which enters into all tests on sheet materials whether they are porous or not. This is that the pressure of the escaping air may tend to warp a section of the material away from the smooth surface just as any fluid under pressure will tend to form a channel of escape along the line of least resistance. This factor is reduced to its most negligible status by creating a balance of pressure on both sides of the sheet. Applicant's device is primarily intended to test the smoothness of paper, but other materials may be likewise tested and many of these materials may closely approach an impervious state, while some may be absolutely impervious. The best method of assuring comparable results on all grades of paper and other sheet materials is to eliminate this possible variable factor.

My device is intended to be standardized so that all extraneous factors such as the friction of bearings 12, adhesion of the liquid to cylinder 13, frictional resistance to the air flowing through tube 16 and smoothness of block faces 20 will be constant and can thus be eliminated from consideration. With these factors constant, the time factor is the only variable and the results of all tests can be expressed in acceptable standard units.

The construction and arrangement of parts may be varied, as is obvious to those skilled in the making of precision instruments, without departing from the spirit of my invention, the scope of which is expressed in the following claims which are to be broadly construed. Applicant wishes to point out that many of the features of his device may be duplicated in substance even though not necessarily in exact details, the following serving to illustrate: By the term "cylinder" applicant is not confining himself to a body of circular cross section, since obviously a body of any other determinable cross section will achieve the same results. Likewise, the term "liquid" means any liquid provided that the same liquid is used in all tests, and the term "air" means a gas, since any gas will achieve the same result provided that the same gas is used in all tests.

What I claim is:

1. Apparatus for determining the smoothness of paper or like sheet materials which comprises; a smooth surface, means to hold a sample of the material against said smooth surface, means to pass air at substantially constant pressure between the material and said surface, and means to indicate the time required for a unit quantity of air to pass.

2. Apparatus for determining the smoothness of paper or like sheet materials which comprises; a smooth surface, means to hold a sample of the material against said smooth surface and to create balanced fluid pressure on both sides of said sample, means to pass air between the material and said surface, and means to indicate the time required for a unit quantity of air to pass.

3. Apparatus for testing the smoothness of paper or like sheet materials comprising a pair of containers each holding liquid, a movable chamber in each container containing air and open at one end, said end extending into said liquid, a tube communicating with each chamber, a plate for each tube having a smooth surface and an opening therein communicating with the free end of its respective tube, said plates cooperating to clamp a sample of material to be tested between the smooth surface thereof, and means to indicate the rate of escape of air from said chamber.

4. Apparatus for testing the smoothness of paper or like sheet materials comprising a pair of containers each holding liquid, a movable cylinder in each container containing air and open at one end, said end extending into said liquid, a tube communicating with each cylinder, a plate for each tube having a smooth surface and an opening therein to which its respective tube communicates, said plates cooperating to clamp a sample of material to be tested between the smooth surfaces thereof, and electrical means associated with each of said cylinders to indicate the rate of escape of air from said cylinders between said surfaces and sample.

5. Apparatus for testing the smoothness of paper or like sheet materials comprising a pair of containers each holding a liquid, a movable cylinder in each container containing air and open at one end, said end extending into said liquid, a tube communicating with each cylinder, a plate for each tube having a smooth surface and an opening therein to which the respective tube communicates, said plates cooperating to clamp a sample of the material to be tested between the smooth surfaces thereof, means to hold said cylinders in inoperative position, said means being releasable to permit said cylinders to descend freely into said liquid as the air from each cylinder escapes between the surface of its respective plate and the adjacent surface of said sample.

6. Apparatus for testing the smoothness of paper or like sheet materials comprising a pair of containers each holding a liquid, a movable cylinder in each container containing air and open at one end, said end extending into said liquid, a tube communicating with each cylinder, a plate for each tube having a smooth surface and an opening therein to which its respective tube communicates, said plates cooperating to clamp a sample of the material to be tested between the smooth surfaces thereof, means to hold said cylinders in inoperative position, said means being releasable to permit said cylinders to descend freely into said liquid as the air from each cylinder escapes between the surface of its respective plate and the adjacent surface of said sample, and electrical means to indicate the rate of escape of air from each of said cylinders between the surfaces of said plates and the surfaces of the sample.

7. Apparatus for comparing the smoothness of paper or like sheet materials which comprises, means for maintaining a sheet in contact with a smooth surface of known area, means for producing and maintaining a predetermined and constant pressure on a predetermined volume of gas and allowing said gas to escape at constant pressure between said surface and said sheet, and means for utilizing the passage of said gas to indicate the time required for the passage of said predetermined volume of gas.

8. Apparatus for measuring the smoothness of paper or like sheet materials which comprises, opposed smooth surfaces of equal area between which a sheet may be placed, means for producing and maintaining a predetermined and constant pressure on a predetermined volume of gas means to pass said gas between each side of said sheet and the surface bearing on that side in such manner that the pressure is balanced on each side of the sheet, and means to indicate the time required for the passage of said predetermined volume of gas.

9. Apparatus for comparing the smoothness of paper or like sheet materials which comprises; containing means to maintain a quantity of gas at a constant pressure, a second containing means to maintain a quantity of gas at a corresponding constant pressure, a pair of members having smooth surfaces, one of which is associated with one of the containing means and the other of which is associated with the other of said containing means, said members being adapted to hold a sample of the material between the smooth surfaces thereof, means to pass gas from each of said containing means between the smooth surface of its associated member and the adjacent surface of the sample of material while maintaining the constant pressure, and means associated with each one of said containing means to indicate the rate of passage of gas therefrom.

RALPH A. MASTEN.